(12) United States Patent
Nakayama et al.

(10) Patent No.: US 6,567,562 B1
(45) Date of Patent: May 20, 2003

(54) ENCODING APPARATUS AND METHOD

(75) Inventors: Tadayoshi Nakayama, Tokyo (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,839

(22) Filed: Oct. 4, 1999

(30) Foreign Application Priority Data

Oct. 6, 1998 (JP) ............................................. 10-284121

(51) Int. Cl.[7] ................................................. G06K 9/36
(52) U.S. Cl. ......................... 382/246; 382/238; 382/240
(58) Field of Search ................................. 382/232–233, 382/251, 234, 238, 239, 240, 244–246, 166, 236, 248, 250; 375/240.03, 240.11, 240.12, 240.19, 240.2, 240.23, 240.27, 240.25, 240.18, 240.24; 341/65, 67, 63, 106, 107; 358/476, 539

(56) References Cited

U.S. PATENT DOCUMENTS

| | | | |
|---|---|---|---|
| 5,581,373 A | 12/1996 | Yoshida | ........................ 358/476 |
| 5,751,860 A | * 5/1998 | Su et al. | ...................... 382/244 |
| 5,764,374 A | * 6/1998 | Seroussi et al. | ............. 382/244 |
| 5,801,650 A | 9/1998 | Nakayama | ..................... 341/67 |
| 5,818,970 A | 10/1998 | Ishikawa et al. | ............. 382/248 |
| 5,841,381 A | 11/1998 | Nakayama | ..................... 341/67 |
| 5,986,594 A | 11/1999 | Nakayama et al. | .......... 341/107 |
| 6,263,109 B1 | * 7/2001 | Ordentlich et al. | .......... 382/232 |

* cited by examiner

*Primary Examiner*—Phuoc Tran
*Assistant Examiner*—Ishrat Sherali
(74) *Attorney, Agent, or Firm*—Fitzpatrick, Cella, Harper & Scinto (57) ABSTRACT

Disclosed is an arrangement for easily and quickly performing variable length coding for a multi-valued image, while estimating coding efficiency. To achieve the above objective, an encoding apparatus, which encodes a plurality of sets of multi-valued image data to produce code having variable lengths based on the multi-valued image data and a parameter k, comprises a bit shift unit for performing bit shifts for each of the multi-valued image data sets a different number of times in accordance with the parameter k and for outputting P sets of data, P accumulation adders for accumulating the P sets of data in correlation with the parameter k, for each of the multi-valued data sets, and comparators for comparing the results obtained by the accumulation adders to determine an optimal parameter k for each of the multi-valued image data sets.

6 Claims, 7 Drawing Sheets

| LL | HL |
|---|---|
| LH | HH |

*FIG. 2B*

| LL | HL | HL |
| LH | HH | |
| LH | | HH |

*FIG. 2C*

| LL | HL3 | HL2 | HL1 |
| LH3 | HH3 | | |
| LH2 | HH2 | | |
| LH1 | | | HH1 |

FIG. 3

| FREQUENCY COMPONENT | QUANTIZING STEP Q |
|---|---|
| LL | 1 |
| HL3 | 2 |
| LH3 | 2 |
| HH3 | 2 |
| HL2 | 4 |
| LH2 | 4 |
| HH2 | 4 |
| HL1 | 8 |
| LH1 | 8 |
| HH1 | 8 |

FIG. 4

| V \ K | 0 | 1 | 2 |
|---|---|---|---|
| 0 | 1 | 10 | 100 |
| 1 | 01 | 11 | 101 |
| 2 | 001 | 010 | 110 |
| 3 | 0001 | 011 | 111 |
| 4 | 00001 | 0010 | 0100 |
| 5 | 000001 | 0011 | 0101 |
| 6 | 0000001 | 00010 | 0110 |
| 7 | 00000001 | 00011 | 0111 |

FIG. 6

| COEFFICIENT VALUE (QUANTIZING VALUE) | 3 | 4 | −2 | −5 | −4 | 0 | 1 | ... |
|---|---|---|---|---|---|---|---|---|
| CODE (+/−) | 1 | 1 | 0 | 0 | 0 | 1 | 1 | |
| FIRST PLANE (MSB) | 1 | 0 | 1 | 0 | 0 | 1 | 1 | |
| SECOND PLANE | 1 | 1 | 1 | 1 | 1 | 0 | 0 | |
| THIRD PLANE | 1 | 0 | 0 | 0 | 0 | 0 | 1 | |
| FOURTH PLANE | ▨ | 0 | ▨ | 1 | 0 | ▨ | ▨ | |
| ⋮ | | | | | | | | |

CODE PLANE (+/−)   FIRST PLANE (MSB)   SECOND PLANE

FIG. 8

ENCODING APPARATUS AND METHOD

BACKGROUND OF THE INVENTION

1. Field of the Invention

The present invention relates to an image data encoding apparatus and an image data encoding method.

2. Related Background Art

Included in an image, particularly a multi-valued image, is a great amount of information, and an enormous amount of space is required to store or transmit the data for such an image. Therefore, to facilitate the storage or transmission of image data, the amount of data that must be handled is reduced by using a high-efficiency encoding process whereby image redundancies are removed, or another one whereby the image data are compressed in such a manner that some data are lost, but the degree of loss is such that the resulting deterioration of the image quality is extremely difficult to detect visually.

One well known, high-efficiency encoding method is the JPEG compression encoding method. According to this method, a multi-valued image is divided into blocks and a DCT transform performed for each block, and the obtained frequency component is quantized for variable length coding.

A problem with coding that employs a DCT transform is that when a high compression rate is set distortion occurs in a block in a decoded image. Recently, to remove this distortion, a new encoding method using a wavelet transform has been proposed.

Further, variable length coding is frequently employed as a part of these various high-efficiency coding methods.

However, a simple process by which to employ a method for the variable length coding of a multi-valued image, and a circuit configuration by which variable length coding can be performed rapidly have not yet been established.

SUMMARY OF THE INVENTION

To resolve the conventional problems, it is one objective of the present invention to provide a configuration for easily and rapidly performing variable length coding for a multi-valued image, and in particular, for easily and rapidly performing a determination process for estimating coding efficiency and for determining, as needed, a parameters to be used for coding.

To achieve the above objective, according to the present invention, an encoding apparatus for an image processing apparatus, one which encodes a plurality of sets of multi-valued image data (corresponding to the quantized values for one sub-block in the preferred embodiments of this invention) to produce code having variable lengths (corresponding to Golomb code in the embodiments) based on the multi-valued image data and a parameter k (corresponding to parameter k in the embodiments), comprises:

a bit shift unit (corresponding to a unit 501a in the embodiments) for performing bit shifts for each of the multi-valued image data sets a different number of times (0 to a times in the embodiments) in accordance with the parameter k (corresponding to k=0 to a in the embodiments) and for outputting P sets ((a+1) sets in the embodiments) of data;

P accumulation adders (corresponding to those units labeled 502a to 502z in the embodiments) for accumulating the P sets of data in correlation with the parameter k, for each of the multi-valued data sets (for each sub-block in the embodiments); and comparators (corresponding to those units labeled 503a to 503z in the embodiments) for comparing the results obtained by the accumulation adders to determine an optimal parameter k for each of the multi-valued image data sets.

In addition, to achieve the above objective, according to the present invention an encoding apparatus, which employs one of a plurality of coding parameters to encode a plurality of sets of multi-valued image data to obtain coded data having a fixed length code portion and a variable length code portion, comprises:

a calculation unit for calculating in parallel, for each of the coding parameters, the total amount of code that is obtained when the multi-valued image data are encoded;

a detection unit for detecting the smallest total amount of code provided by the calculation unit when calculating the total amounts of code; and a holding unit for storing a value representing a coding parameter that corresponds to the smallest total amount of code identified by the detection unit.

Other objectives and features of the present invention will become obvious during the course of the following explanation of the preferred embodiments, given while referring to the accompanying drawings.

DETAILED DESCRIPTION OF THE PREFERRED EMBODIMENTS (First Embodiment)

A first embodiment of the present invention will now be described while referring to the accompanying drawings.

In this embodiment, monochrome image data of 8 bits each are encoded. It should be noted, however, that the coding performed by the present invention is not limited to data having this length, but can also be applied for a monochrome image wherein each pixel is represented by four bits, or a color, multi-valued image wherein each color component (RGB/Lab/YCrCb) of each pixel is represented by 8 bits. The present invention can also be applied for encoding multi-valued information wherein the state of each pixel constituting an image is represented; for example, for encoding a multi-valued index wherein the color of each pixel is represented. When the present invention is applied for the above encoding, only various types of multi-valued information need be encoded as monochrome image data, which will be described later.

Figure 1:
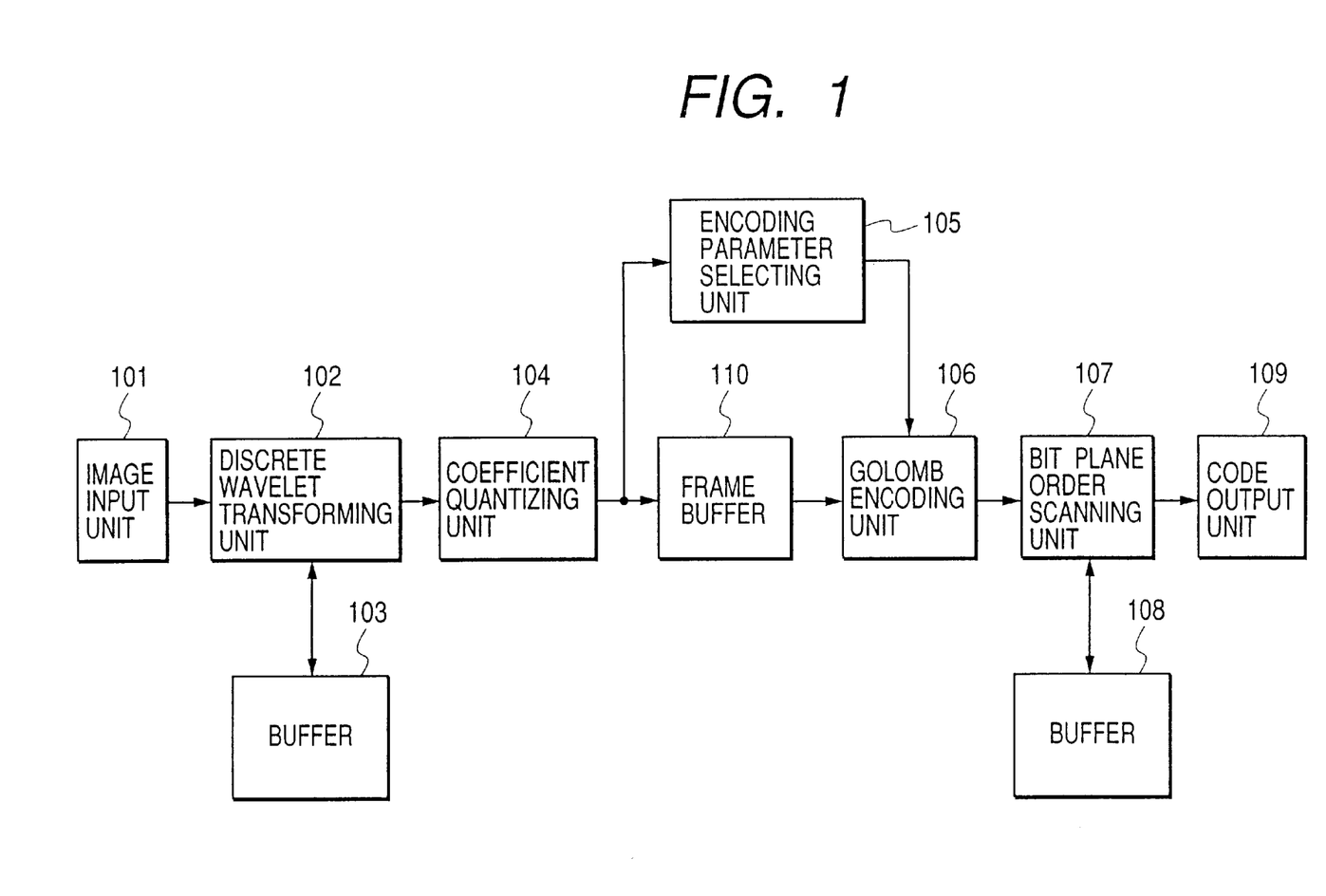
FIG. 1 is a block diagram employed for the individual preferred embodiments of the present invention.

FIG. 1 is a block diagram illustrating an image processing apparatus for carrying out the first embodiment of the present invention. The image processing apparatus comprises: an image input unit 101, a discrete wavelet transforming unit 102, a buffer 103, a coefficient quantizing unit 104, an encoding parameter selecting unit 105, a Golomb (Golomb-Rice) encoding unit 106, a bit plane order scanning unit 107, a buffer 108, a code output unit 109, and a frame buffer 110.

First, image data that constitute an image to be encoded are obtained by the image input unit 101 in the raster scan order. The image input unit 101 is, for example, a photographing device, such as a scanner or a digital camera; an image pickup device, such as a CCD; or an interface for a network line. The image input unit 101 may be a storage medium, such as a RAM, a ROM, a hard disk or a CD-ROM.

The discrete wavelet transforming unit 102 receives pixel data for one screen from the image input unit 101, and temporarily stores them in the buffer 103.

Figure 2A:
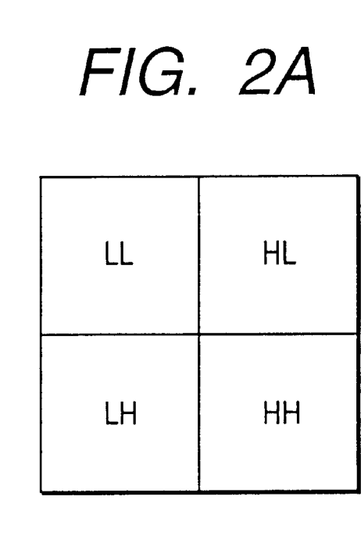
FIGS. 2A, 2B and 2C are diagrams for explaining a discrete wavelet transform.

The discreet wavelet transforming unit 102 then performs a well known discrete wavelet transform for the pixel data for one screen stored in the buffer 103, and separates the data into a plurality of frequency bands. In this embodiment, the discrete wavelet transform for image data string x(n) is performed by using the following equation.

$$r(n)=\text{floor }\{x(2n)+x(2n+1))/2\}$$

$$d(n)=x(2n+2)-x(2n+3)+\text{floor }\{-r(n)+r(n+2)+2)/4\}$$

where r(n) and d(n) are transform coefficients: r(n) being a low frequency component, and d(n) being a high frequency component; and floor $\{X\}$ denotes a maximum integer that does not exceed X. While this transform equation is for one-dimensional data, a two-dimensional transform can be performed by applying this transform in the horizontal direction and in the vertical direction, in the named order. Therefore, the image data string can be divided into four frequency bands (sub-blocks) LL, HL, LH and HH, as shown in FIG. 2A.

Figure 2B:
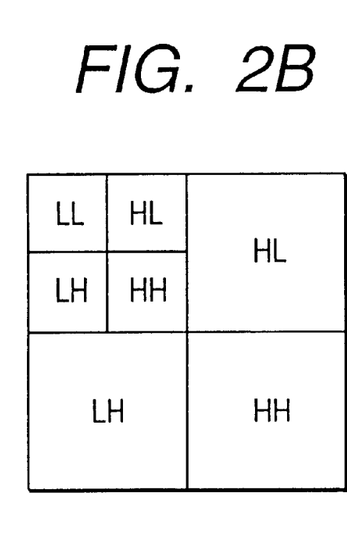
Figure 2C:
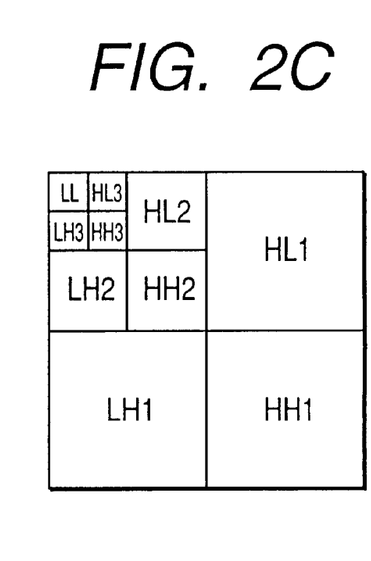

When the discrete wavelet transform is performed in the same manner for the obtained LL component, the LL component is divided to obtain seven frequency bands (sub-blocks), as shown in FIG. 2B. In this embodiment, the discrete wavelet transform is repeated one more time for the seven frequency bands to obtain the 10 frequency bands (sub-blocks) LL, HL3, LH3, HH3, HL2, LH2, HH2, HL1, LH1 and HH1 shown in FIG. 2C.

The transform coefficient is output to the coefficient quantizing unit 104 in the sub-block order, LL, HL3, LH3, HH3, HL2, LH2, HH2, HL1, LH1 and HH1, and in the raster scan order for each sub-block.

The coefficient quantizing unit 104 receives the wavelet transform coefficients from the discrete wavelet transforming unit 102, quantizes each coefficient at a quantizing step defined for each frequency component, and outputs the values obtained by quantization to the encoding parameter selecting unit 105 and the frame buffer 110.

Figure 3:
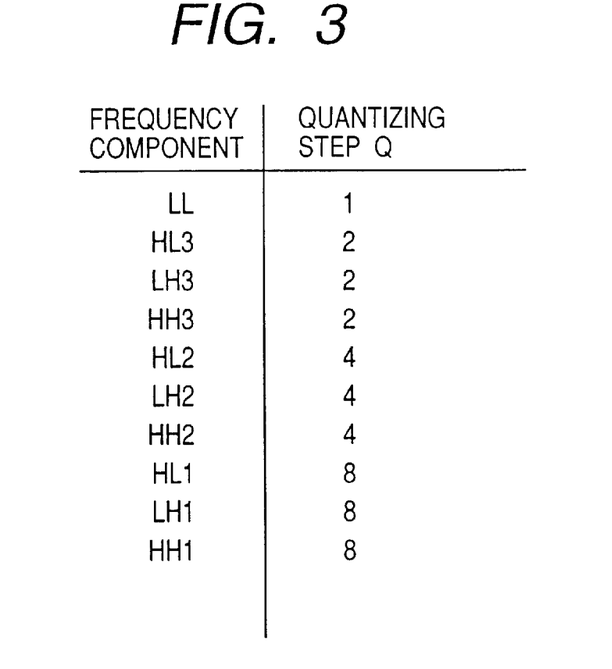
FIG. 3 is a diagram showing a quantizing step used for a frequency component (sub-block)

When the coefficient value is X and the quantizing step for a frequency component to which this coefficient belongs is q, after quantization, coefficient value Q(X) is calculated using the following equation.

$$Q(X)=\text{floor}\{(X/q)+0.5\}$$

where floor $\{X\}$ is a maximum integer that does not exceed X. FIG. 3 is a diagram showing the individual frequency components in this embodiment and corresponding quantizing steps. As is shown in FIG. 3, the quantizing step for a high frequency component (HL1, LH1 or HH1) is greater than is that for a low frequency component (LL, etc.).

The quantized values are stored in the frame buffer 110 until parameter k, which is required by the Golomb encoding unit 106 at the succeeding stage to encode the quantized values, is determined.

The encoding parameter selecting unit 105 employs a received quantized value to select the parameter k, which is used by the Golomb encoding unit 106 at the succeeding stage for Golomb encoding. This parameter k is a value representing the code length of a fixed length portion used to perform the variable length coding called Golomb encoding. In the explanation, for the sake of convenience an explanation will be given for the operation performed by the Golomb encoding unit 106 before one is given for the encoding parameter selecting unit 105.

Although the basic Golomb encoding method performed by the Golomb encoding unit 106 is well known, an explanation will now be given for the basic encoding operation and the characteristic portion of this invention.

First, a quantized value is received from the frame buffer 10. for each sub-block. This is done because the Golomb encoding unit 106 changes the parameter k for each sub-block to use it for the Golomb encoding.

The Golomb encoding unit 106 determines whether each of the received quantized values is a positive value or a negative value, and outputs a sign (code) (+or -). Specifically, when the quantized value is 0 or positive, a value of "1" is output as a sign bit. When the quantized value is negative, a value of "0" is output.

Next, the Golomb encoding is performed for the absolute value of each quantized value. When the absolute value of a quantized value to be encoded is V and the parameter applied for a sub-block to be processed is k, the Golomb encoding is performed in the following manner.

Figure 4:
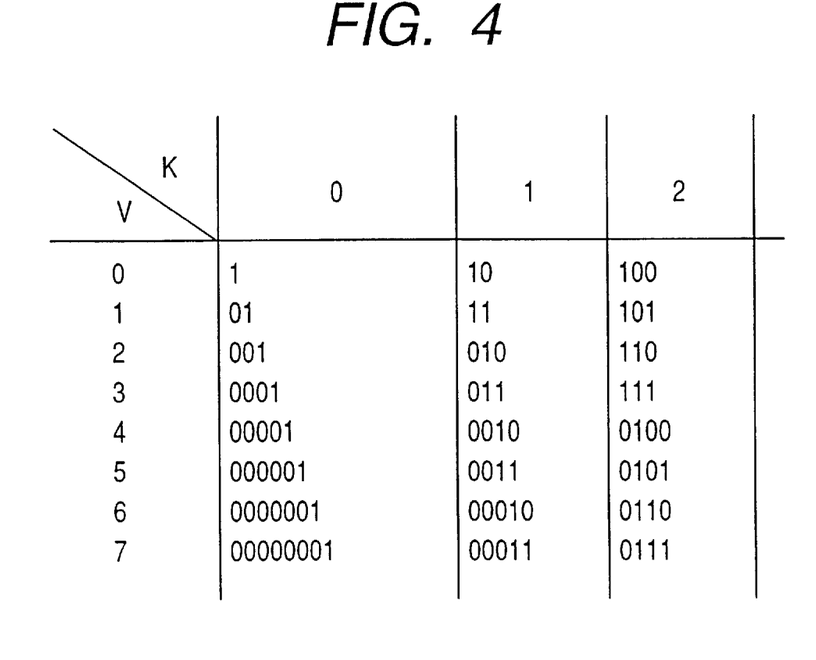
FIG. 4 is a diagram showing example variable length code obtained using Golomb coding.

First, bit data representing V is shifted k bits to the right, and integer m in the decimal system, which is represented by the obtained bit data, is calculated. Based on the result, m "0"s are arranged in line, a "1" is sequentially located as a delimiter bit, and finally, the lower k bits representing the original V are arranged so that variable length code (Golomb code) is generated. FIG. 4 is a diagram showing one part of the variable length code obtained by performing the above Golomb encoding for k=0, 1 or 2.

That is, it can be easily estimated that the code length in bits of each of the variable length codes that is obtained from the absolute value of each quantized value and the parameter k is ((bit count m indicated by integer m)+(delimiter bit count 1)+(bit count k corresponding to the value of the parameter k)).

Further, as is apparent from FIG. 4, when the parameter k=0, in particular, the length of the Golomb code corresponding to the quantized value "0" is shorter than the length when the parameter k=1 or 2. This means that as the group of quantized values to be encoded is nearer 0, it is appropriate for the Golomb encoding to be performed with a smaller parameter k.

The Golomb encoding used here provides a result to the effect that encoding and decoding can be enabled by using a simple calculation, while in actuality the code table shown in FIG. 4 is required. Normally, for variable length coding such as Huffman coding, a table must be prepared for variable length code and a corresponding value that is to be encoded. In particular, the table is required to change switch a plurality of variable length codes in accordance with a state associated with a value to be encoded.

The encoded data, composed of a sign (+or −) bit for the received quantized value and the variable length code (Golomb code), is generated and is output to the bit plane order scanning unit 107 at the succeeding stage.

Figure 5:
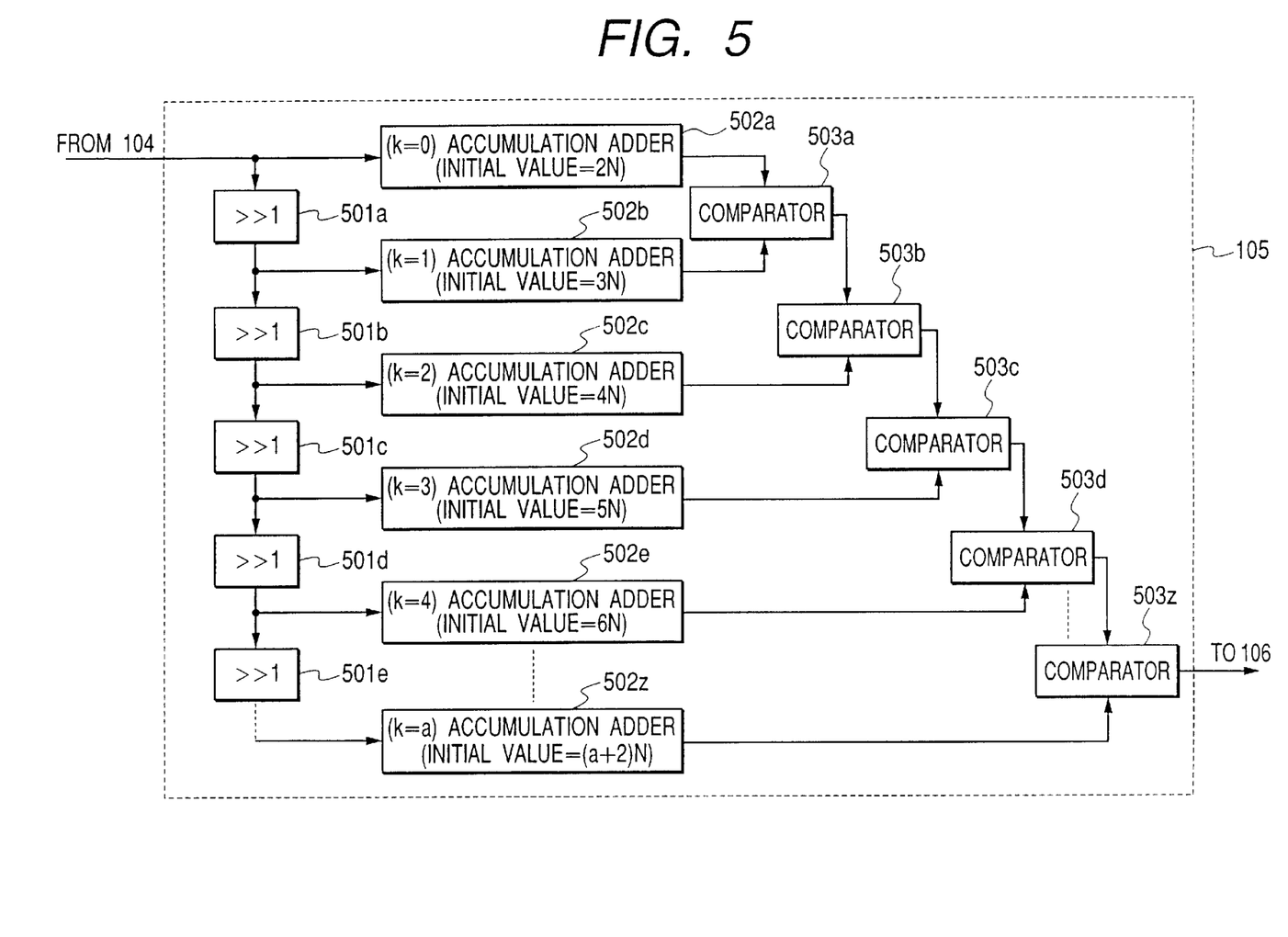
FIG. 5 is a detailed diagram illustrating an encoding parameter selecting unit according to a first embodiment of the present invention.

FIG. 5 is a diagram showing the detailed arrangement of the encoding parameter selecting unit 105 for generating the parameter k that is required by the Golomb encoding unit 106.

As is described above, usually, to generate the parameter k used for Golomb encoding, the deviation of a group of quantized values to be encoded is obtained by forming a histogram for images (quantized values) that are actually to be encoded.

However, a large memory capacity is required to generate such a histogram.

To resolve this problem, the arrangement shown in FIG. 5 is employed for this embodiment.

In FIG. 5, bit shift units 501a, 501b, 501c, . . . shift a received quantized value one bit to the right. Accumulation adders 502a to 502z store initial values 2N to (a+2)N respectively, and add N values that are sequentially input. Each of the adders 502 includes and outputs ID information together with the value obtained by adding the N values. Each of the comparators 503a to 503z compares the accumulated values received from two adders, and outputs the smaller accumulated added value and the ID information to the comparator at the succeeding stage. It should be noted that the comparator 503z at the last stage outputs only the ID information to the Golomb encoding unit 106.

The output of each of the accumulation adders 502a to 502z represents the total code length when the Golomb encoding is performed for the N quantized values based on the parameter k=0, 1, 2, . . . Each code portion has a length in bits of N×(1 (positive or negative sign bit)+1 (delimiter bit)+k (parameter k value)+$\Sigma M_k$ (value obtained by subtracting lower k bits from absolute value V).

For example, the accumulated value output by the accumulation adder 502a is 2N +$\Sigma M_0$, the accumulated value output by the accumulation adder 502b is 3N+$\Sigma M_1$, and the accumulated value output by the accumulation adder 502z is (a+2)N+$\Sigma M_a$.

In this embodiment, the ID information value is the same value as the parameter value, and the Golomb encoding unit 106 can employ the received ID information to rapidly determine the parameter k.

It should be noted that for the explanation given while referring to FIG. 5, N quantized values are included in a sub-block. Thus, to determine the parameter k when it is used to encode a sub-block wherein M quantized values are included, the initial values for the adders 502a to 502z are changed and the values 2M to (a+2)M are used. Such a change in the initial values can be implemented by providing an initial value switching unit (not shown).

The bit plane order scanning unit 107 in FIG. 1 processes each of the frequency components (sub-blocks) described above. First, the bit plane order scanning unit 107 receives data encoded by the Golomb encoding unit 106, and stores the data for one frequency component (one of the sub-blocks LL to HH1) in the buffer 108.

The code (+or −) bit corresponding to each pixel generated by the Golomb encoding unit 106 is stored in a positive/negative sign plane; the first bit (MSB) of the Golomb code that corresponds to each pixel is stored in the first bit plane; the second bit is stored in the second bit plane; and the third and the following bits are stored in the third and the following bit planes. In this manner, encoded data corresponding to the individual pixels are stored in the buffer 108 as a plurality of bit planes.

When, for example, the data output by the Golomb encoding unit 106 is "0110", "0" is stored in the positive/negative sign plane, "1" is stored in the first bit plane, "1" is stored in the second bit plane, and "0" is stored in the third bit plane. No bit information is stored in the fourth bit plane.

Figure 6:
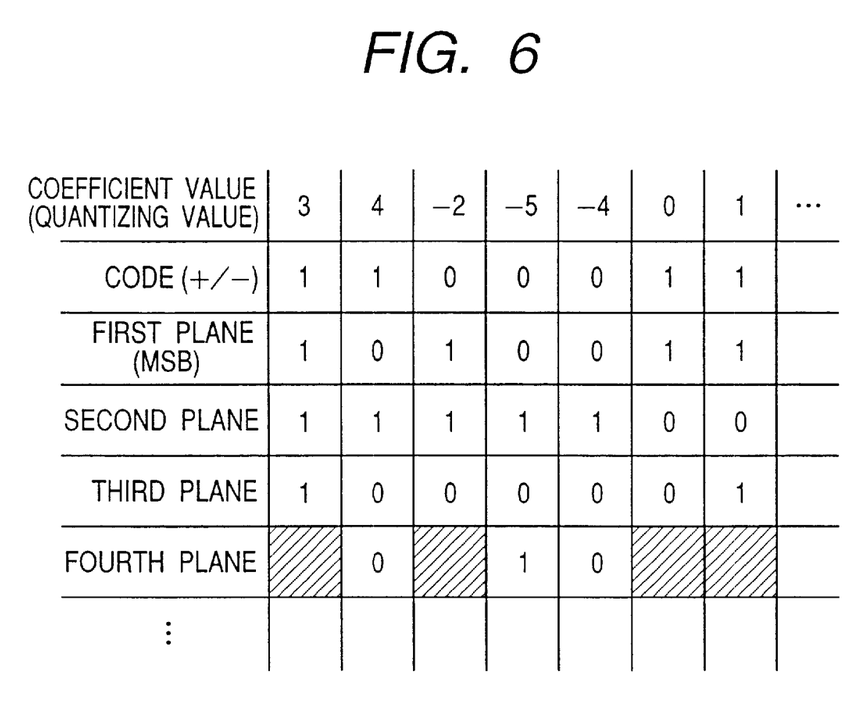
FIG. 6 is a diagram showing variable length code obtained by using Golomb encoding and represented by using a bit plane.

FIG. 6 is a diagram showing a table wherein a series, "3, 4, −2, −5, −4, 0, 1, . . . ", of coefficient data values (quantized values) quantized for the HL3 component are encoded using the Golomb encoding unit 106, and the obtained data are stored as bit planes.

In FIG. 6, shaded portions represent locations for which, since the entry of coded data is terminated in the upper planes, no bit information is required, i.e., wherein no bit information is entered. The bit plane order scanning unit 107 receives from the Golomb encoding unit 106 all the code data representing one frequency component (one of the sub-blocks LL to HH1), and stores the data in the buffer 108, as described above. Then, the bit plane order scanning unit 107 reads the information from the bit planes in the raster scanning order and in the order represented by the sign bit plane, the first bit plane and the second bit plane, i.e., in the order beginning with the sign bit plane and continuing down to the lowest bit plane, and outputs it to the code output unit 109.

Figure 7:
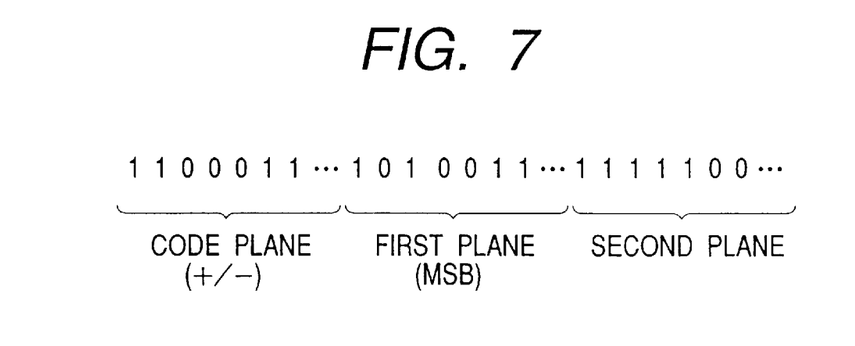
FIG. 7 is a diagram showing the structure of a bit stream that is finally output.

FIG. 7 is a diagram showing the format of the bit information that is extracted from the buffer 108 and output in the bit plane order.

The data are output hierarchically for each bit plane in the order of the sub-blocks for the low frequency components, LL, HL3, LH3, HH3, HL2, LH2, HH2, HL1, LH1 and HH1.

The code output unit 109 hierarchically outputs the obtained plurality of bit plane data sets. An interface for a public telephone network, a radio network or a LAN can be employed as the code output unit 109. The code output unit 109 may also be a storage device, such as a hard disk, a RAM or DVD, for storing the hierarchial data.

Since the images are hierarchically transmitted in order from the low frequency component to the high frequency component, the reception side can obtain the outline of an image hierarchically. Further, since data for the individual frequency components are also transmitted hierarchically for each bit plane, the reception side can also obtain the outline of each frequency component hierarchically. In addition, since each pixel (transform coefficient) is expressed by using a variable data length, the total amount of code can be reduced compared with the amount obtained when normal encoding is used for each bit plane.

It should be noted that information required by the decoding side, such as the image size, the bit count for each pixel, the quantizing step for each frequency component or the parameter k, is added as needed to the encoded data in the embodiment. For example, for the image processing for each line, for each block or for each band, information indicating the size of image is required.

(Second Embodiment)

Figure 8:
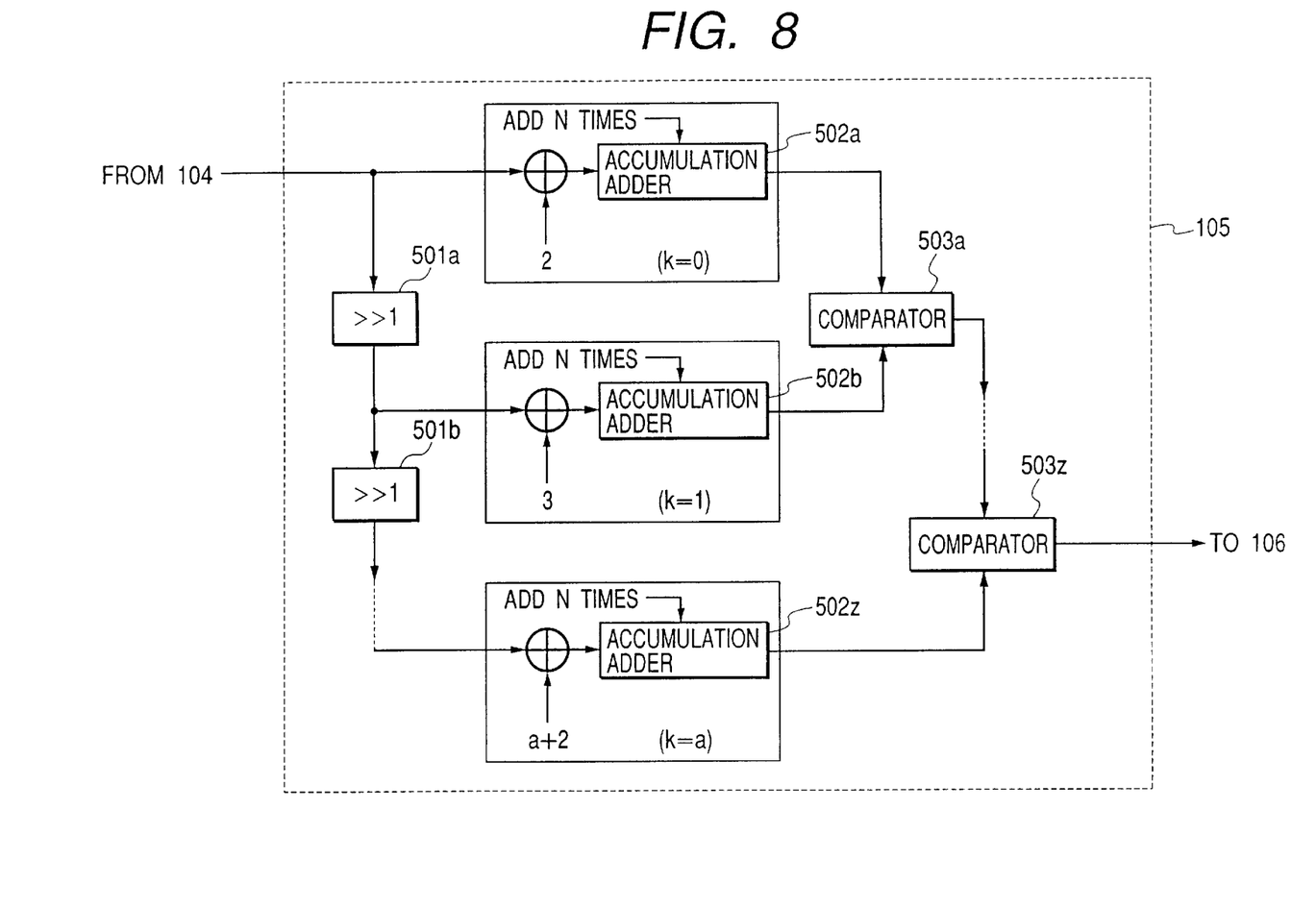
FIG. 8 is a detailed diagram illustrating an encoding parameter selecting unit according to a second embodiment of the present invention.

Another arrangement for the encoding parameter selecting unit 105 in the first embodiment will now be described. The same reference numerals as are used in FIG. 5 are used to denote corresponding blocks in this embodiment.

In FIG. 8, bit shift units 501a, 501b, . . . shift a received quantized value one bit to the right. Initially, a value of 0 is held by each of the accumulation adders 502a to 502z, but upon receiving each of N values, accumulates a new value provided by adding K+2 to each of the N values. Held in each of the accumulation adders 502 is ID information that is output to the succeeding stage with the value obtained by accumulating N values. Comparators 503a to 503z compare the accumulated values received from two adders, and output, to a succeeding comparator, the smaller of the two values and the ID information that corresponds to that value.

It should be noted that at the last stage the comparator 503z outputs only ID information to the Golomb encoding unit 106. The output of the adders 502a to 502z represents the total code length obtained by performing the Golomb encoding of N quantized values based on parameter k=0, 1, 2 ... The length of each code portion in bits is N×(1(positive or negative sign bit)+1 (delimiter bit)+k (parameter k value)+$\Sigma M_k$ (value obtained by removing lower k bits from absolute value V).

For example, the accumulated value output by the accumulation adder 502a is $2N+\Sigma M_0$, the accumulated value output by the accumulation adder 502b is $3N+\Sigma M_1$, and the accumulated value output by the accumulation adder 502z is $(a+2)N+\Sigma M_a$.

In this embodiment, the ID information has the same value as the parameter value, and the Golomb encoding unit 106 can employ the received ID information to rapidly determine the parameter k.

It should be noted, for the explanation given while referring to FIG. 8, that N quantized values are included in a sub-block. Thus, to determine the parameter k used to encode a sub-block wherein M quantized values are included, in the adders 502a to 502z k+1 must only be added M times.

The processing performed at the preceding and succeeding stages of the encoding parameter selecting unit 105 is the same as that performed for the first embodiment.

(Third Embodiment)

In the second embodiment, a value of 2N is commonly included in the value output by the accumulation adders 502a to 502z. Since the comparators 503a to 503z compare the amounts of code, the output of each accumulation adder need not always match the amount of code, and need only be a numerical value that represents a relative difference.

Figure 9:
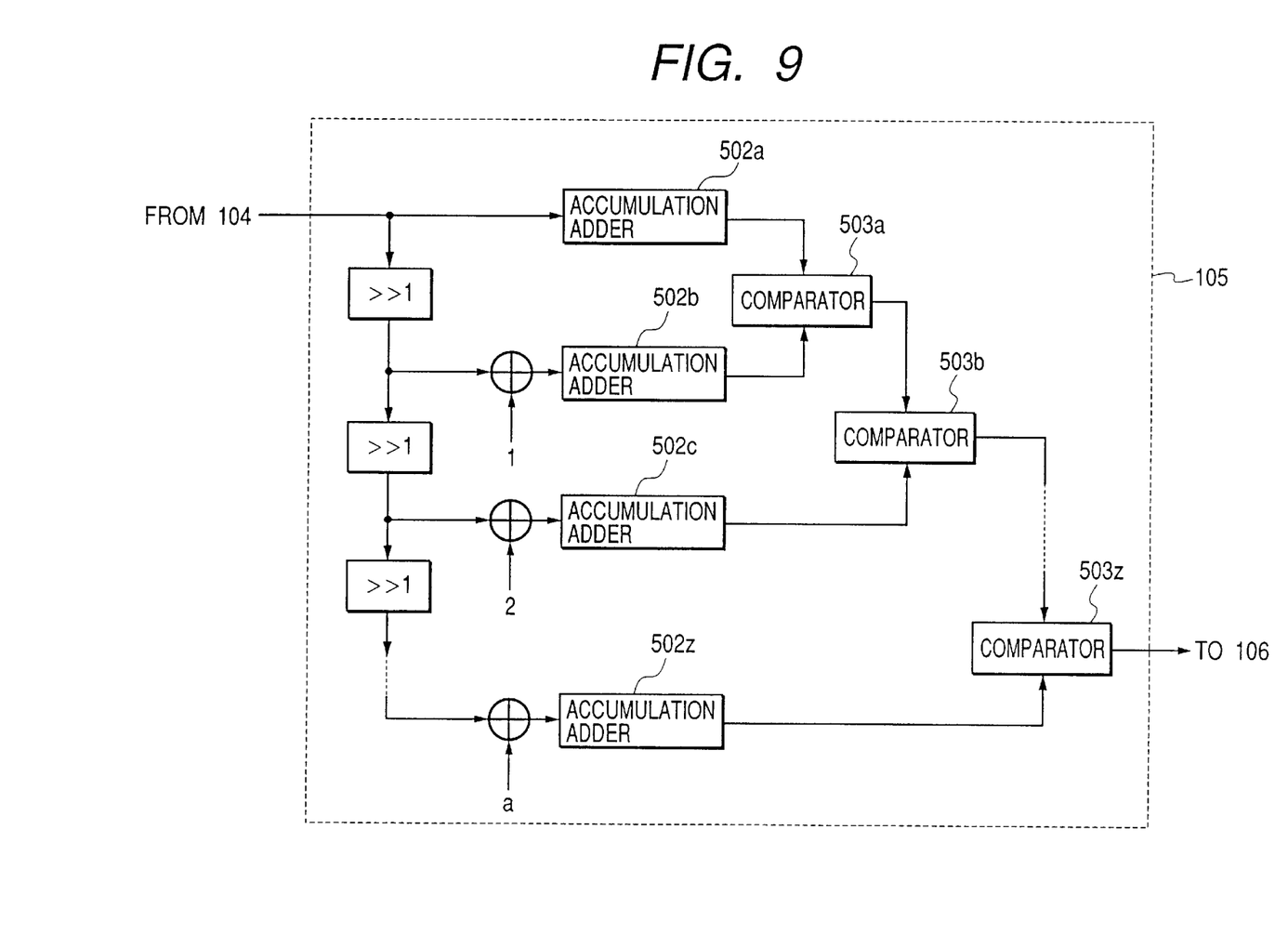
FIG. 9 is a detailed diagram illustrating an encoding parameter selecting unit according to a third embodiment of the present invention.

Therefore, the accumulation adder 502a adds received quantized values unchanged, the accumulation adder 502b adds a value obtained by incrementing by one the value received from the bit shift unit 501a, and the accumulation adder 503c adds a value obtained by adding 2 to the value received from the bit shift unit 501b.

FIG. 9 is a diagram that briefly shows this operation.

The result obtained by linking the ID information with the obtained accumulated value is output to the succeeding comparator. The comparator performs the comparison, as in the second embodiment, to obtain ID information that corresponds to the parameter k for which the amount of code is the smallest.

The method used for comparing the accumulated values in this embodiment can also be applied for the first embodiment. The same effect as in the third embodiment can be obtained when, for example, the initial value held by the accumulation adder 502a in FIG. 5 is 0, the initial value held by the accumulation adder 502b is N, the initial value held by the accumulation adder 502c is 2N, the initial value held by the accumulation adder 502d is 3N, the initial value held by the accumulation adder 502e is 4N, . . .

(Other Embodiment)

In the above embodiments, the bit information for each bit plane is output unchanged. The present invention is, however, not limited to these embodiments. Instead of outputting the bit information unchanged to the code output unit, high-efficiency coding can be performed for the bit information that is finally output in the first embodiment, so that the total amount of code can be reduced. Run length coding or arithmetic coding can be employed as the high-efficiency coding, and higher-efficiency coding can be implemented. In the above embodiment, coding performed by using the discrete wavelet transform for an input image is employed. The present invention is not limited to the discrete wavelet transform used for these embodiments, and a different filter type or a different frequency division method may be employed. Furthermore, the present invention may be applied for encoding based on a transforming method, such as the DCT transform (discrete cosine transform), in addition to the discrete wavelet transform.

The method used for quantizing the frequency component or the variable length coding method is not limited to that used for the embodiments. For example, one frequency component (sub-block) can be sorted to several classes by identifying the local property of each block, and the quantizing step and the encoding parameter may be designated for each class.

(Modification)

The present invention may be applied as one part of a system that is constituted by a plurality of apparatuses (e.g., a host computer, an interface device, a reader and a printer), or as a part of an apparatus (e.g., a copier or a facsimile machine).

Further, the present invention is not limited to the apparatuses or the methods used to implement the above embodiments, but can also include a case where software program code for implementing the previous embodiments is supplied to a computer (or a CPU or an MPU) in an apparatus or in a system, and in consonance with the program, the computer in the system or in the apparatus can operate various devices to accomplish the above embodiments.

In this case, the program code read from the storage medium performs the functions assigned to the embodiments, and the program code and the means for supplying the program code to the computer, specifically, the storage medium on which such program code is recorded, constitutes the present invention.

A storage medium for supplying such program code can be, for example, a floppy disk, a hard disk, an optical disk, a magneto-optical disk, a CD-ROM, a magnetic tape, a nonvolatile memory card or a ROM.

In addition, the present invention includes not only the case where the functions in the previous embodiments can be performed by the computer reading and executing program code, but also the case where, in accordance with an instruction in the program code, an OS (Operating System) running on the computer performs part, or all, of the actual processing.

Furthermore, the present invention includes a case where program code, read from a storage medium, is written in a memory that is mounted on a function expansion board inserted into a computer, or inserted into a function expansion unit connected to a computer, and in consonance with a program code instruction, a CPU mounted on the function expansion board, or in the function expansion unit, performs part, or all, of the actual processing in order to implement the functions included in the above described embodiments.

As is described above, according to the present invention a configuration can be provide that can easily and quickly perform variable length coding for a multi-valued image. In particular, the process for estimating coding efficiency and for determining, as needed, a parameter to be used for coding, can be easily and quickly performed.

What is claimed is:

1. An encoding apparatus, which encodes a plurality of sets of multi-valued image data to produce code having variable lengths based on said multi-valued image data and a parameter k, comprising:

a bit shift unit for performing bit shifts for each of said multi-valued image data sets a different number of times in accordance with said parameter k and for outputting P sets of data;

P accumulation adders for accumulating said P sets of data in correlation with said parameter k, for each of said plurality of sets of multi-valued image data;

comparators for comparing results obtained by said accumulation adders to determine an optimal parameter k for each of said plurality sets of multi-valued image data; and variable length coding means for encoding each of said plurality of sets of multi-valued image data to obtain variable length code having a variable length portion, based on said multi-valued image data, and a fixed length portion, based on said parameter k, wherein said variable length code obtained by said variable length coding means has a bit length (m+k+2) that is obtained by adding (k+2) to a value m that is obtained by shifting said multi-valued image data k bits.

2. An encoding apparatus according to claim 1, wherein said plurality of sets of multi-valued image data are quantized values obtained by performing a wavelet transform for original multi-valued image data, and by quantizing the obtained transform coefficient.

3. An encoding apparatus according to claim 2, wherein said plurality of sets of multi-valued image data are quantized values that correspond to one of a plurality of sub-blocks that are obtained by said wavelet transform.

4. An encoding apparatus according to claim 1, wherein said P accumulation means holds individual, differing initial values that correspond to said parameter k.

5. An encoding apparatus according to claim 1, wherein said different times performed in accordance with said parameter k includes 0.

6. An encoding method which encodes a plurality of sets of multi-valued image data to produce code having variable lengths based on said multi-valued image data and a parameter k, comprising the steps of:

performing bit shifts for each of said multi-valued image data sets a different number of times in accordance with said parameter k and outputting P sets of data;

accumulating said P sets of data in correlation with said parameter k, for each of said plurality of sets of multi-valued image data;

comparing results obtained by said accumulating step to determine an optimal parameter k for each of said plurality sets of multi-valued image data; and encoding each of said plurality of sets of multi-valued image data to obtain variable length code having a variable length portion, based on said multi-valued image data, and a fixed length portion, based on said parameter k, wherein said variable length code obtained by said encoding step has a bit length (m+k+2) that is obtained by adding (k+2) to a value m that is obtained by shifting said multi-valued image data k bits.

* * * * *

UNITED STATES PATENT AND TRADEMARK OFFICE
CERTIFICATE OF CORRECTION

PATENT NO.     : 6,567,562 B1                                           Page 1 of 1
DATED          : May 20, 2003
INVENTOR(S)    : Tadayoshi Nakayama et al.

It is certified that error appears in the above-identified patent and that said Letters Patent is hereby corrected as shown below:

Column 1,
Line 46, "a parameters" should read -- parameters --.

Column 3,
Line 28, "discreet" should read -- discrete --.

Column 5,
Line 4, "change switch" should read -- change (switch) --.

Column 8,
Line 65, "provide" should read -- provided --.

Column 9,
Line 18, "plurality" should read -- plurality of --.

Column 10,
Line 6, "P accumulation means" should read -- P accumulation adders --;
Line 9, "times" should read -- number of times --;
Line 10, "includes" should read -- include --; and
Line 23, "plurality" should read -- plurality of --.

Signed and Sealed this

Eighteenth Day of November, 2003

JAMES E. ROGAN
*Director of the United States Patent and Trademark Office*